(12) United States Patent
Schreiner

(10) Patent No.: US 8,900,544 B2
(45) Date of Patent: Dec. 2, 2014

(54) SULFUR REMOVAL METHODS

(71) Applicant: Bernhard Schreiner, Oberhaching (DE)

(72) Inventor: Bernhard Schreiner, Oberhaching (DE)

(73) Assignee: Linde Aktiengesellschaft, Munich (DE)

(*) Notice: Subject to any disclaimer, the term of this patent is extended or adjusted under 35 U.S.C. 154(b) by 0 days.

(21) Appl. No.: 14/193,310

(22) Filed: Feb. 28, 2014

(65) Prior Publication Data

US 2014/0294719 A1   Oct. 2, 2014

(30) Foreign Application Priority Data

Mar. 28, 2013  (EP) .................................... 13001642

(51) Int. Cl.
  *C01B 17/04* (2006.01)
  *C01B 17/05* (2006.01)

(52) U.S. Cl.
  CPC ............. *C01B 17/05* (2013.01); *C01B 17/0447* (2013.01)
  USPC ...................... 423/573.1; 423/244.1; 423/539; 423/574.1; 423/576.8; 48/127.3; 48/127.5; 48/127.7

(58) Field of Classification Search
  USPC ............. 423/573.1, 574.1, 576.8, 539, 244.1; 48/127.3, 127.5, 127.7
  See application file for complete search history.

(56) References Cited

U.S. PATENT DOCUMENTS

| | | | |
|---|---|---|---|
| 4,044,114 A | 8/1977 | Dezael et al. | |
| 4,533,529 A | 8/1985 | Lee | |
| 4,888,162 A * | 12/1989 | Brian | 423/574.1 |
| 5,266,274 A * | 11/1993 | Taggart et al. | 422/112 |
| 5,294,428 A * | 3/1994 | Watson | 423/574.1 |
| 5,547,648 A | 8/1996 | Buchanan et al. | |
| 7,172,746 B1 | 2/2007 | Rischard | |
| 2005/0180913 A1* | 8/2005 | Graville et al. | 423/576.8 |
| 2009/0193969 A1 | 8/2009 | Schmidt et al. | |

FOREIGN PATENT DOCUMENTS

FR    2 952 629 A1    5/2011

* cited by examiner

*Primary Examiner* — Timothy Vanoy
(74) *Attorney, Agent, or Firm* — Philip H. Von Neida

(57) ABSTRACT

A method for removing sulphur from a fluid by the steps of providing a first fluid comprising a sulphur-containing compound; adsorbing the sulphur of sulphur-containing compound onto an adsorbent; regenerating the adsorbent by oxidation of the adsorbed sulphur to sulphur dioxide thereby yielding an off-gas stream comprising sulphur dioxide; providing a second fluid comprising hydrogen sulphide, using the second fluid and the off-gas stream as reactants in a Claus process for producing elemental sulphur, wherein a part of hydrogen sulphide provided by the second fluid is oxidized to sulphur dioxide and water at reaction temperature, the residual hydrogen sulphide, the resulting sulphur oxide and the sulphur oxide provided by the off-gas stream are converted to elemental sulphur, the oxygen required for the oxidation of the hydrogen sulphide provided by the second fluid is provided by an air stream, and the off-gas stream dilutes the second fluid in the Claus process.

15 Claims, 3 Drawing Sheets

SULFUR REMOVAL METHODS

CROSS-REFERENCE TO RELATED APPLICATIONS

This application claims priority from European Patent Application 13001642.1 filed Mar. 28, 2013.

BACKGROUND OF THE INVENTION

The present invention relates to a method for removing sulphur from a fluid.

Such a method comprises the steps of providing a first fluid comprising a sulphur-containing compound, adsorbing the sulphur of the sulphur-containing compound onto an adsorbent, particularly in the presence of hydrogen, regenerating the adsorbent by oxidation of the adsorbed sulphur to sulphur dioxide thereby yielding an off-gas stream comprising sulphur dioxide, providing a second fluid comprising hydrogen sulphide, using the second fluid and the off-gas stream as reactants in a Claus process for producing elemental sulphur, wherein a part of hydrogen sulphide provided by the second fluid is oxidized to sulphur dioxide and water at an reaction temperature, and wherein the residual hydrogen sulphide, the resulting sulphur oxide and the sulphur oxide provided by the off-gas stream are converted to elemental sulphur, and wherein the oxygen required for the oxidation of the hydrogen sulphide provided by the second fluid is provided by an air stream, and wherein the off-gas stream dilutes the second fluid in the Claus process.

Sulphur recovery units based on the so-called "Modified Claus Process" produce elemental sulphur from feed gases with high concentration of $H_2S$ by partial oxidation of the latter using air as the primary oxidant. This air oxidation is performed by applying an open flame inside a combustion chamber (also denoted as Claus furnace). Feeds of Claus units operated in oil refineries are typically gas streams having a high concentration of $H_2S$ (i.e., acid gas) sometimes combined with a second stream of so-called sour water stripper gas containing $H_2S$ and major amounts of ammonia ($NH_3$).

The stability of any flame based on fuel combustion is highly dependent on the concentration of inflammables within the fuel stream; i.e. the more diluted the fuel with compounds not taking part in the oxidation process the lower the flame temperature. In the extreme case the flame may even expire. In case of inerts like nitrogen this effect is most obvious but if $SO_2$ is being imported into a Claus furnace the complication is even compounded by a second effect—namely that even less of the main combustible (e.g. $H_2S$) can be oxidized to $SO_2$, which is the important reaction partner of residual $H_2S$ within the down-stream sections of the Claus unit. Therefore, in cases of import of gases containing $SO_2$ into a Claus furnace the natural consequence is a, under circumstances even substantial, drop of the furnace temperature. The secondary effects of such temperature decrease are widely known.

Most notorious is the incomplete destruction of so-called trace compounds like persistent hydrocarbons (benzene, toluene, xylenes, styrene) and also $NH_3$. A breakthrough of hydrocarbons leads to catalyst fouling/deactivation and reduced sulphur quality. Even more sensitive to reduced furnace temperature is the efficiency of $NH_3$ destruction. If the latter is incomplete $NH_3$ builds up solid salts at "cold spots" of the downstream Claus section, which can lead to effects like lowered sulphur recovery efficiency, more down-time of the plant, considerable damage due to corrosion, reduced plant capacity etc.

Based on this background, it is the objective of the present invention to provide an efficient and economic method for sulphur removal.

SUMMARY OF THE INVENTION

The problem is solved by a method for removing sulphur from a fluid, comprising the steps of:
providing a first fluid comprising a sulphur-containing compound,
adsorbing the sulphur of said sulphur-containing compound onto an adsorbent, particularly in the presence of hydrogen;
regenerating said adsorbent by oxidation of said adsorbed sulphur to sulphur dioxide thereby yielding an off-gas stream comprising sulphur dioxide;
providing a second fluid comprising hydrogen sulphide;
using said second fluid and said off-gas stream as reactants in a Claus process for producing elemental sulphur;
wherein a part of hydrogen sulphide provided by said second fluid is oxidized to sulphur dioxide and water at a reaction temperature;
wherein the residual hydrogen sulphide, the resulting sulphur oxide and said sulphur oxide provided by said off-gas stream are converted to elemental sulphur;
wherein the oxygen required for said oxidation of said hydrogen sulphide provided by said second fluid is provided by an air stream; and
wherein said off-gas stream dilutes said second fluid in said Claus process, characterized in that, said Claus process is enriched with oxygen for maintaining said reaction temperature equal to or above 1100° C.

According thereto, the Claus process is enriched with oxygen for maintaining the reaction temperature equal to or above 1100° C., preferably above 1200° C., preferably above 1250° C., preferably above 1300° C., preferably above 1400° C.

A fluid in the sense of the present invention particularly refers to a liquid or a gas.

Oxygen enrichment of the Claus process leads to an improvement of the hydrogen sulphide oxidation and to an increase of the reaction temperature.

A further advantage of the method of the invention is that the dilution is compensated by the oxygen enrichment of the Claus process. Because Claus units are limited in their gas-flow rate by design, a dilution of the fed hydrogen sulphide decreases the capacity of the unit. Thereby the yield of elemental sulphur decreases, because less hydrogen sulphide is oxidized and subsequently converted to elemental sulphur. Due to enrichment of the air stream with oxygen, the volume of the air stream can be decreased and a larger volume of hydrogen sulphide can be fed into the Claus unit/Claus process thereby increasing the capacity of the Claus unit/Claus process.

Another advantage of the method according to the invention is that hydrocarbons optionally present in the off-gas stream for example due to insufficient oxidation, particularly in the event of malfunction such as an inadequate supply of air used for the oxidative regeneration of the adsorbent, are oxidized in the Claus process at the reaction temperature described above and thereby removed.

In some embodiments, the Claus process is fed with air enriched with oxygen or directly with pure oxygen. Air enriched with oxygen in the sense of the present invention refers particularly to air with an oxygen content of at least 21% (v/v), 28% (v/v), 45% (v/v), 60% (v/v) or 75% (v/v). Pure oxygen in the sense of the present invention refers particularly to oxygen with a purity of at least 90% (v/v). The use of oxygen enriched air or pure oxygen allows a higher conversion of the hydrogen sulphide in the second fluid in the same unit and avoids undesired side-reactions and pollution with the nitrogen. Additionally, using oxygen, enriched air or pure oxygen allows processing of a second fluid with a low hydrogen sulphide content (particularly below 20% (v/v) $H_2S$) and/or a second fluid comprising ammonia, hydrocarbons, particularly methane or arenes such as benzene, toluene, xylene and styrene.

According to an embodiment of the present invention and in contrast to normal Claus operations, not one third but less than one third of the hydrogen sulphide is converted to sulphur dioxide, which reacts afterwards with the sulphur dioxide provided by the offgas-stream to elemental sulphur.

According to an embodiment of the present invention, the conversion of hydrogen sulphide and sulphur dioxides is performed in presence of a catalyst.

According to an embodiment of the present invention, the catalyst comprises aluminum oxide or titanium oxide.

According to an embodiment of the present invention, the adsorbent is selected from the group consisting of a reduced metal, a metal oxide or a mixed metal oxide, or a reduced metal combined with a metal oxide or a mixed metal oxide (mixtures thereof).

According to an embodiment of the present invention, the reduced metal is selected from zinc, nickel, iron and copper.

According to an embodiment of the present invention, the metal oxide is selected from zinc oxide, nickel oxide, iron oxide and copper oxide.

According to an embodiment of the present invention, the mixed metal oxide is selected from Zn—Fe—O, Zn—Ti—O and Cu—Fe—Al—O.

According to an embodiment of the present invention, the first fluid is selected from the group consisting of raw synthesis gas and a hydrocarbon stream.

According to an embodiment of the present invention, the hydrocarbon stream is selected from the group consisting of a crude oil distillate or crude oil product, natural gas and biogas.

According to an embodiment of the present invention, the sulphur-containing compound is selected from the group comprised of hydrogen sulphide, a mercaptan, a thioether, a dithioether, a substituted or unsubstituted heteroarene, COS and $CS_2$.

According to an embodiment of the present invention, the heteroarene is selected from thiophene and its derivates like e.g., benzothiophene and dibenzothiophene.

According to an embodiment of the present invention, the sulphur contained in the first fluid is adsorbed to the adsorbent in presence of hydrogen in case of the sulphur-containing compound is not hydrogen sulphide.

According to an embodiment of the present invention, the first fluid is adsorbed to the adsorbent in absence of hydrogen in case of the sulphur-containing compound is hydrogen sulphide.

According to an embodiment of the present invention, the second fluid is an acid gas from an acid gas removal process, particularly from amine gas treatment.

According to an embodiment of the present invention, the second fluid further comprises ammonia or a hydrocarbon, wherein ammonia is converted to nitrogen and water and the hydrocarbon is oxidized to carbon dioxide and water at the reaction conditions in the thermal section of the Claus process, particularly at the above mentioned reaction temperature of above 1100° C.

According to an embodiment of the present invention, the hydrocarbon comprised within the second fluid is a light alkane, an olefin or an aromatic compound such as for example benzene, toluene, xylene or styrene.

As an advantage of the present invention the conversion of ammonia to nitrogen at the reaction temperature prevents the formation of solid ammonia salts at cold spots of Claus section down-stream of the Claus furnace.

As another advantage of the present invention, thorough oxidation of the hydrocarbon prevents the fouling or deactivation of the catalyst described above.

According to an embodiment of the present invention, the first fluid comprising the sulphur-containing compound or compounds is hydrogenated, wherein the sulphur-containing compound or compounds are reduced to hydrogen sulphide and a corresponding compound moiety or moieties thereby yielding a fluid enriched with hydrogen sulphide, wherein the hydrogenating is performed before the adsorbing.

According to an embodiment of the present invention, the hydrogenation is performed in presence of hydrogen.

DETAILED DESCRIPTION OF THE INVENTION

Figure 1:
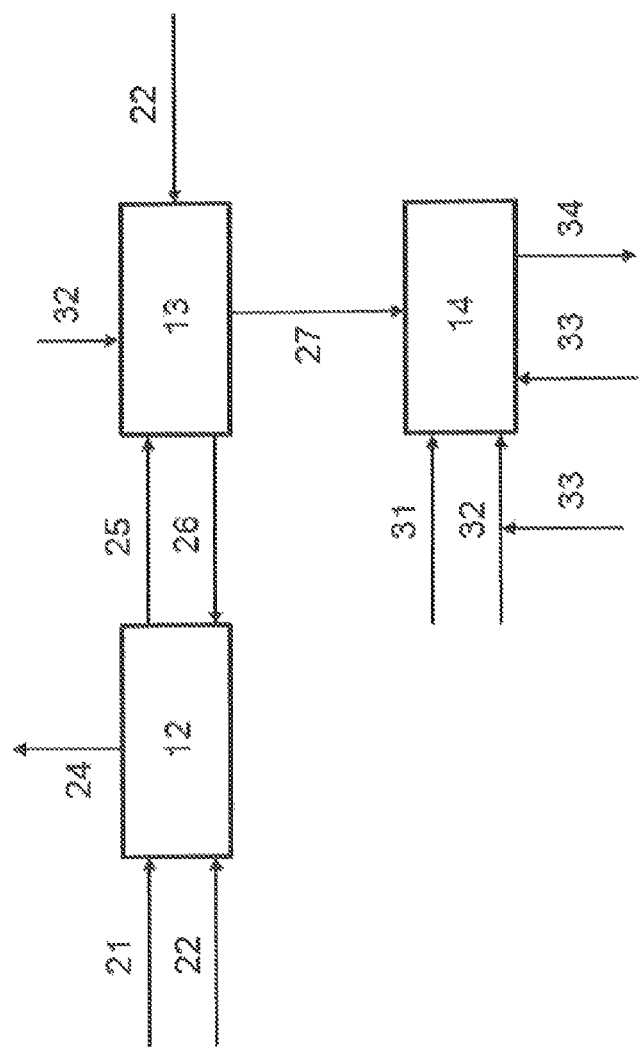
FIG. 1 shows an embodiment of the method according to the invention.

The invention is further characterized, without limitations, by the following examples, from which further features, advantages or embodiments may be derived. The examples do not limit but illustrate the invention.

EXAMPLE 1

In oil refineries a new process for deep desulphurisation of hydrocarbon streams 21 containing S-bearing molecules made its entrance within the last years. This process (also denoted as S-Zorb), based on reductive adsorption 12 of sulphur on a solid 26, leads—by oxidative regeneration 13 of the loaded adsorbent 25 by air 32 oxidation—to an off-gas 27 comprising an appreciable but not dominating amount of $SO_2$ (e.g. 5 vol.-%). A detailed description of said S-Zorb process can be found in Song et al., Applied Catalysis B: Environmental 41 (2003), pages 207-238.

One way of getting rid of this waste stream 27 is to send it into a Claus unit (or Claus process) 14, wherein all the components of this waste stream are present ($N_2$, $O_2$, CO, $CO_2$, arenes, hydrocarbons) respectively are produced within the Claus furnace ($SO_2$, $H_2$, CO, $CO_2$).

In case above mentioned waste stream is fed into the Claus unit 14 it has to be assumed that the temperature in the Claus furnace may drop considerably and that measures may have to be taken to re-establish stability of operation and/or sufficiently efficient trace destruction.

A particularly crucial feature can be seen in dealing with S-Zorb's off-gas 27 by sending it into a Claus unit 14 and the combination of this procedural measure with oxygen application 33 (e.g., oxygen enrichment 33 of the thermal Claus section or step) in order to keep the furnace temperature on an appropriate level.

The method according to the invention provides among others the following advantages: Getting rid of a waste stream 27 comprising $SO_2$ in an environmentally benign manner—i.e., in a way that the sulphur of the $SO_2$ molecules is being recovered in elemental and therefore useful form 34; and by oxygen enrichment 33 ensuring appropriate conditions for reliable and efficient operation of the sulphur recovery process (i.e., Claus process 14).

A hydrocarbon stream 21, preferably a distillate of crude oil, with a sulphur-containing compound such as a mercaptan, a thioether, a dithioether or a heteroarene like thiophene or benzothiophene is contacted 12 with an adsorbent 26 in presence of hydrogen 22 (cf. FIG. 1). The sulphur atom adsorbs 12 onto the adsorbent 26 and reacts with the adsorbent 26, whereby the sulphur atom is removed from the compound and is retained 12 by the adsorbent 26. The adsorbent 26 can be any compound being capable of forming sulphides and is preferably a reduced metal or metal oxide, which forms a metal sulphide when reacting with hydrogen sulphide. The sulphur depleted hydrocarbon stream 24 is then further processed.

The loaded adsorbent 25 is then regenerated by oxidation 13 with molecular oxygen, typically comprised by air, producing a $SO_2$ rich off-gas 27, and the regenerated adsorbent 26 is then retransferred to the adsorbing process 12. Said adsorption 12 is usually performed in a fluid bed reactor 12, wherein the spent adsorbent 25 is continuously withdrawn from the reactor 12 and transferred to a regeneration section 13. In the regeneration section 13 the sulphide is oxidized off of the adsorbent 25 in the presence of air 32, and the cleansed adsorbent 26 is recycled back to the reactor 12. In case the adsorbent 25, 26 is a reduced metal the adsorbent 25 may further be regenerated by reducing with hydrogen 22.

This off-gas stream 27 is then sent into a Claus unit (or Claus process) 14. In the Claus unit 14, a hydrogen sulphide containing second fluid 31 is processed, wherein a part of hydrogen sulphide is oxidized by air 32. The second fluid 31 can be any fluid comprising hydrogen sulphide, for example acid gas from gas sweetening or other acid gas removal processes. Typically, one third of the hydrogen sulphide is converted to sulphur oxide that reacts afterwards with the remaining two third of the hydrogen sulphide to elemental sulphur 34. Because the off-gas stream 27 provides a certain amount of sulphur dioxide, less than one third of the hydrogen sulphide needs to be oxidized.

The Claus process 14 is usually performed in a Claus unit 14 consisting essentially of a furnace representing the thermal section of the Claus unit 14, wherein the hydrogen sulphide is oxidized, and a catalytic converter representing the catalytic section, wherein the converter is a reactor designed to facilitate the reaction of hydrogen sulphide and sulphur oxide to elemental sulphur 34. The converter can comprise a bed containing catalyst such as aluminum oxide or titanium oxide. One or two additional catalytic converters are typically connected to a first catalytic converter. Before entering the catalytic converter the second fluid 31 may be re-heated above 200° C. by suitable means for heating such as a heat exchanger. The formation 14 of elemental sulphur 34 may, to a certain degree, already take place in parallel to the oxidation reaction 14 in the furnace.

The elemental sulphur 34 can be removed in a condenser, wherein the sulphur vapor 34 condenses to liquid sulphur 34. The sulphur vapor 34 can be additionally cooled in the condenser below 140° C. Additionally, a condenser can be arranged between the furnace and the catalytic converter.

By sending the off-gas 27 into the Claus unit 14, the reaction mixture consisting of the second fluid 31 and air 32 is diluted causing a drop of the reaction temperature and a decrease of the hydrogen sulphide concentration in the reaction 14. Additionally, because a Claus unit 14 is usually limited by gas flow-rate, adding additional volumes decrease the volume and therefore amount of the hydrogen sulphide that can be converted. This negative effect is compensated by enriching the air 32 or directly the Claus process 14 with oxygen 33. The oxygen enrichment 33 supports the oxidation 14 of the hydrogen sulphide resulting in a higher temperature and a higher hydrogen sulphide conversion rate.

Particularly, the oxygen concentration of the air 32 is increased such that the volume of the air 32 can be reduced, thus compensating the dilution effect of the off-gas 27 injection. Further, the application of oxygen 33 enriched air 32 into the Claus process 14 ensures that a desired reaction temperature of at least 1100° C. is maintained, preferably a reaction temperature of at least 1250° C. (see also above).

The second fluid 31 may further comprise trace compounds like persistent hydrocarbons (e.g. benzene, toluene, xylenes, or styrene). The trace compounds are oxidized 14 to carbon monoxide, carbon dioxide and water at temperatures above 1100° C., which prevents catalyst fouling/deactivation and reduced sulphur 34 quality caused by the trace compounds. The second fluid 31 may also comprise ammonia, which is converted to nitrogen and water at temperatures above 1100° C. This conversion is almost totally complete at temperature above 1250° and prevents the formation of solid build-ups and blockages caused by ammonia salts.

Figure 2:
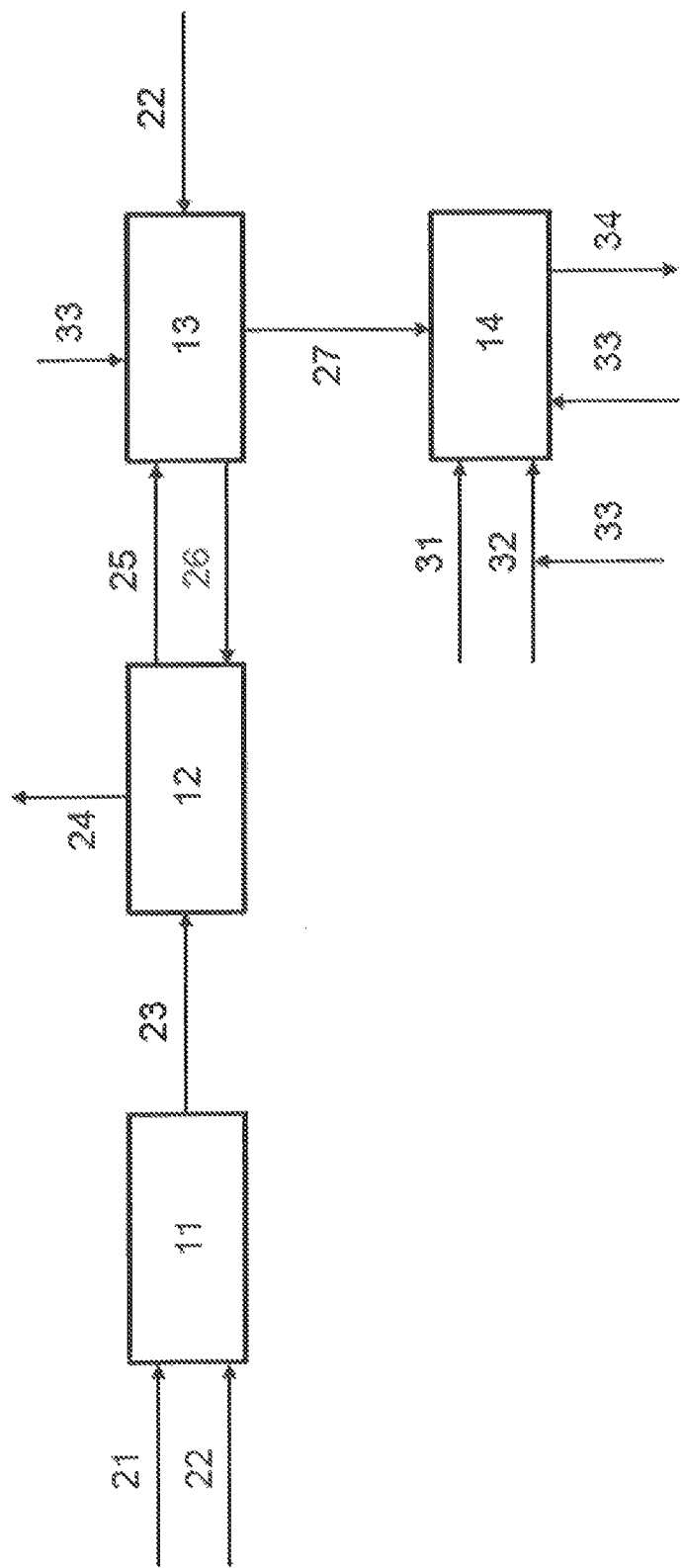
FIG. 2 shows another embodiment of the method according to the invention.

Alternatively, the hydrocarbon stream 21 may first be treated with hydrogen 22 in presence of a suitable catalyst such Co—Mo/$Al_2O_3$ or Ni—Mo/$Al_2O_3$, whereby the sulphur-containing compound is reduced to hydrogen sulphide and a residual compound moiety (cf. FIG. 2). After this, the resulting hydrocarbon stream 23 enriched with hydrogen sulphide is then contacted with an adsorbent 26, wherein the hydrogen sulphide reacts 12 with the adsorbent 26, and wherein the sulphur atom is retained 12 by the adsorbent. Adsorption 12, regeneration 13 and feeding the resulting off-gas stream 27 to the Claus unit 14 is performed analogously to the above described example.

EXAMPLE 2

This concept not only holds for waste streams coming from the S-Zorb process mostly applied within oil refineries. For gasification schemes an adsorptive process is already highly developed in order to realize hot gas desulphurisation. Here, also a waste gas is produced in the adsorbent regeneration step, which can be sent into a Claus unit. Here, again, the combination with oxygen application is an elegant solution; getting rid of $SO_2$ by recovering the sulphur. Also the sulphur removal of other gas streams such as natural gas is a source for sulphur dioxide rich waste streams, which can be processed as described above.

Figure 3:
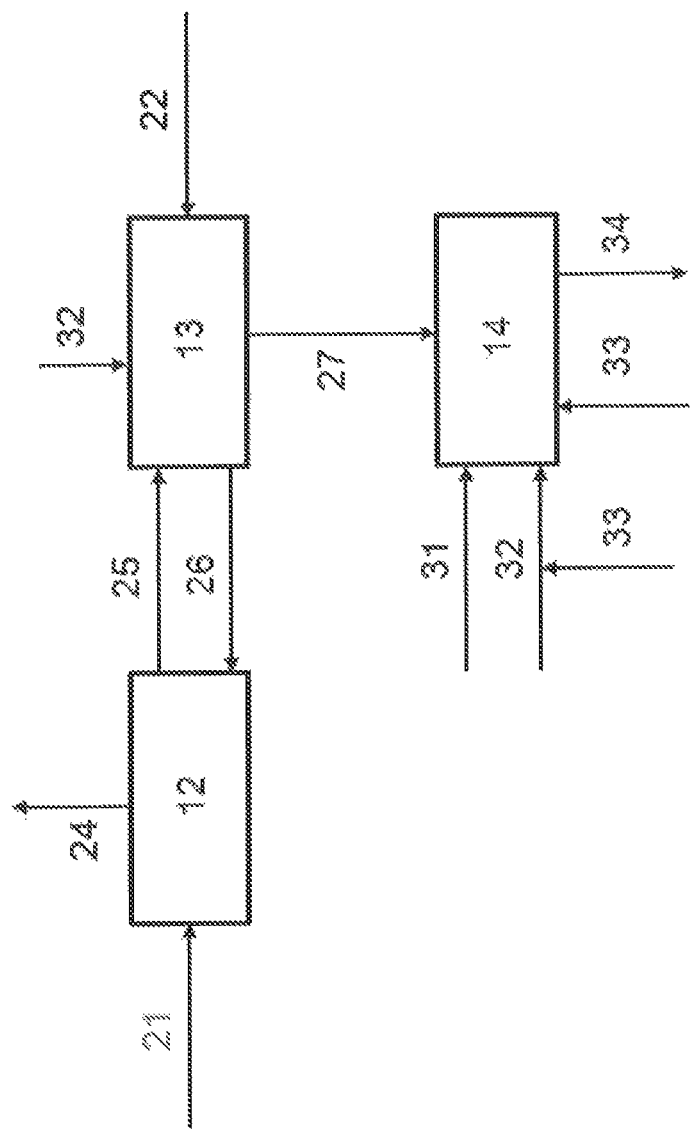
FIG. 3 shows yet another embodiment of the method according to the invention.

In case of a hydrocarbon stream such as natural gas or another gas stream such as raw synthesis gas already comprises hydrogen sulphide, the stream (21) is directly contacted with the adsorbent (FIG. 3) without any work-up. Again, adsorption 12, regeneration 13 and feeding the resulting off-gas stream 27 to the Claus unit 14 is performed analogously to the above described examples.

LIST OF REFERENCE NUMBERS

| 11 | Hydrogenation |
| 12 | Adsorption |
| 13 | Regeneration |
| 14 | Claus process |

-continued

LIST OF REFERENCE NUMBERS

| | |
|---|---|
| 21 | Fluid stream with sulphur- containing compound |
| 22 | Hydrogen |
| 23 | Fluid stream with hydrogen sulphide |
| 24 | Fluid stream with reduced amount of sulphur containing compound |
| 25 | Loaded adsorbent with bound hydrogen sulphide |
| 26 | Free adsorbent |
| 27 | Off-gas of the regenerating ($SO_2$, $N_2$ and optionally hydrocarbons) |
| 31 | Feed gas for Claus process ($H_2S$, $NH_3$, COS, $CS_2$, hydrocarbons) |
| 32 | Air |
| 33 | Oxygen |
| 34 | Elemental sulphur |

What I claim is:

1. A method for removing sulphur from a fluid, comprising the steps of:
providing a first fluid comprising a sulphur-containing compound;
adsorbing the sulphur of said sulphur-containing compound onto an adsorbent;
regenerating said adsorbent by oxidation of said adsorbed sulphur to sulphur dioxide thereby yielding an off-gas stream comprising sulphur dioxide;
providing a second fluid comprising hydrogen sulphide;
using said second fluid and said off-gas stream as reactants in a Claus process for producing elemental sulphur;
wherein a part of hydrogen sulphide provided by said second fluid is oxidized to sulphur dioxide and water at a reaction temperature;
wherein the residual hydrogen sulphide, the resulting sulphur oxide and said sulphur oxide provided by said off-gas stream are converted to elemental sulphur;
wherein the oxygen required for said oxidation of said hydrogen sulphide provided by said second fluid is provided by an air stream; and
wherein said off-gas stream dilutes said second fluid in said Claus process;
characterized in that,
said Claus process is enriched with oxygen for maintaining said reaction temperature equal to or above 1100° C.

2. The method according to claim 1, characterized in that said Claus process is enriched with oxygen for maintaining said reaction temperature equal to or above 1200° C.

3. The method according to claim 1, characterized in that said Claus process is enriched with oxygen for maintaining said reaction temperature equal to or above 1250° C.

4. The method according to claim 1, characterized in that said Claus process is enriched with oxygen for maintaining said reaction temperature equal to or above 1300° C.

5. The method according to claim 1, characterized in that said Claus process is enriched with oxygen for maintaining said reaction temperature equal to or above 1400° C.

6. The method according to claim 1, characterized in that the adsorbing the sulphur of the sulphur-containing compound onto an adsorbent is performed in the presence of hydrogen.

7. The method according to claim 1, characterized in that said air stream is enriched with oxygen.

8. The method according to claim 1, characterized in that oxygen is directly fed to said Claus process.

9. The method according to claim 1, characterized in that said adsorbent is selected from the group consisting of a reduced metal, a metal oxide, a mixed metal oxide, and mixtures thereof.

10. The method according to claim 9, characterized in that the reduced metal is selected from the group consisting of zinc, nickel, iron and copper.

11. The method according to claim 9, characterized in that the metal oxide, is selected from the group consisting of zinc oxide, nickel oxide, iron oxide, and copper oxide.

12. The method according to claim 9, characterized in that the mixed metal oxide is selected from the group consisting of Zn—Fe—O, Zn—Ti—O, and Cu—Fe—Al—O.

13. The method according to claim 1, characterized in that said first fluid is selected from the group consisting of a raw synthesis gas and a hydrocarbon stream.

14. The method according to claim 13, characterized in that the hydrocarbon stream is selected from the group consisting of a crude oil distillate, a crude oil product, natural gas and biogas.

15. The method according to claim 1, characterized in that said first fluid is hydrogenated, wherein said sulphur-containing compound is reduced to hydrogen sulphide and a corresponding compound moiety, and wherein said hydrogenating is performed before said adsorption.

* * * * *